United States Patent [19]

Bott

[11] E Re. 29,348

[45] Reissued Aug. 9, 1977

[54] SPARE TIRE EXTRACTION DEVICE

[76] Inventor: John A. Bott, 931 Lakeshore Drive, Grosse Pointe Shores, Mich. 48236

[21] Appl. No.: 725,987

[22] Filed: Sept. 23, 1976

Related U.S. Patent Documents

Reissue of:

[64] Patent No.: 3,940,041
Issued: Feb. 24, 1976
Appl. No.: 360,094
Filed: May 14, 1973

[51] Int. Cl.[2] ..... B62D 43/00

[52] U.S. Cl. ..... 224/42.12; 296/37.2

[58] Field of Search ..... 224/42.06, 42.12, 42.21, 224/42.23, 42.24, 45 A, 45 AA, 45 F, 45 J, 45 T, 45 W, 50, 52, 55, 56, 57, 29 R, 42.45 R, 42.42 R; 296/37 A, 37.2; 294/1 A, 26, 74; 16/114 R

[56] References Cited

U.S. PATENT DOCUMENTS

| | | | |
|---|---|---|---|
| 941,072 | 11/1909 | Huber | 224/45 T UX |
| 2,531,805 | 11/1950 | Clark | 294/1 A |
| 2,547,083 | 4/1951 | Lundgren | 296/37.2 UX |
| 2,823,069 | 2/1938 | Walker | 214/451 |
| 3,323,667 | 6/1967 | Hall | 224/42.06 |
| 3,712,586 | 1/1973 | Nicholson | 224/42.21 |
| D. 219,704 | 1/1971 | Ziaylek | D8/230 |

FOREIGN PATENT DOCUMENTS

| | | | |
|---|---|---|---|
| 843,709 | 8/1960 | United Kingdom | 224/42.12 |

*Primary Examiner*—Robert J. Spar
*Assistant Examiner*—Jerold M. Forsberg
*Attorney, Agent, or Firm*—Harness, Dickey & Pierce

[57] ABSTRACT

A strap has a handle formed at one of its ends and a fastener at its other end. The fastener is fitted in the bolt hole of the wheel on which a spare tire is mounted. The strap goes under the tire and provides a means for conveniently removing the spare tire and wheel from the trunk of a passenger car.

3 Claims, 5 Drawing Figures

FIG. 1.
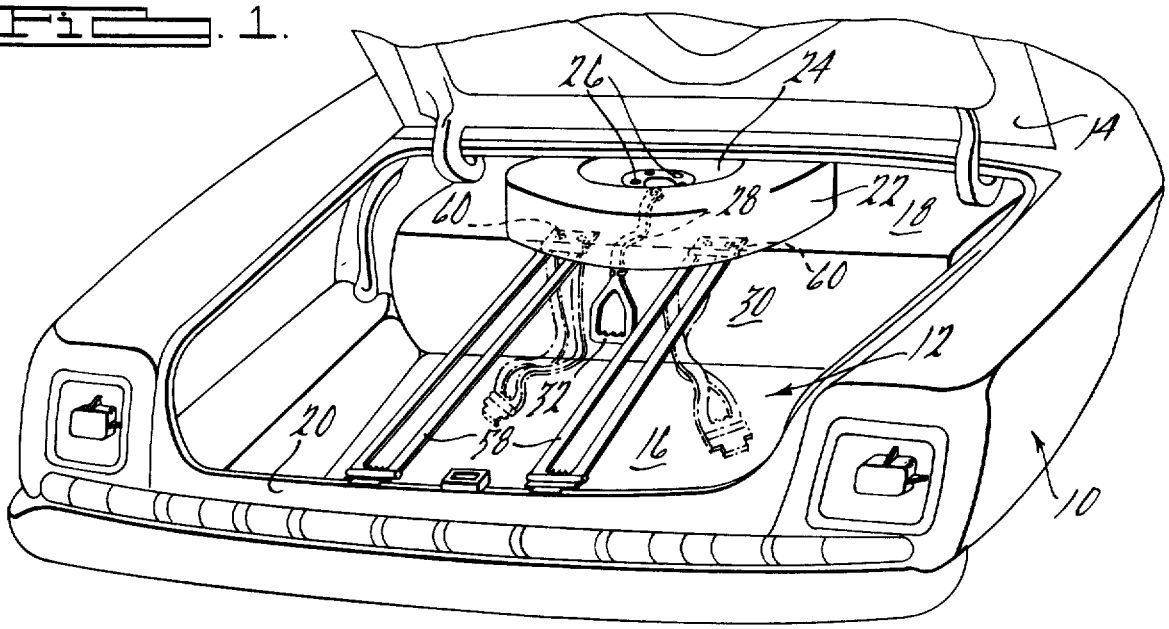
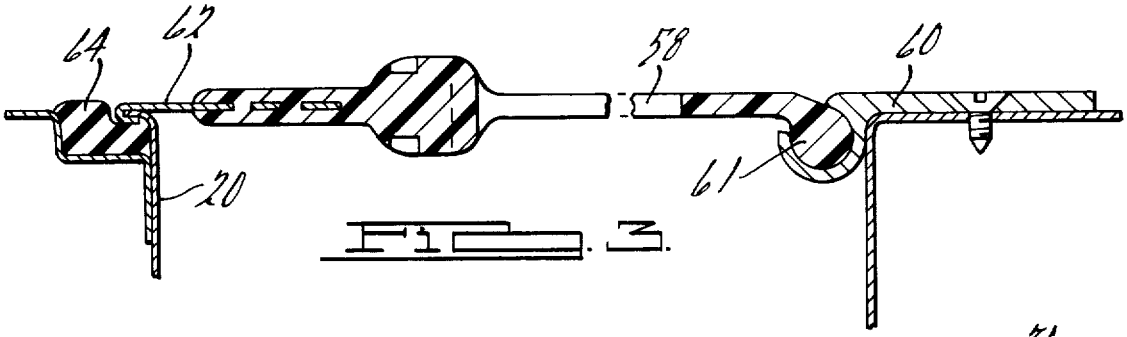
FIG. 3.
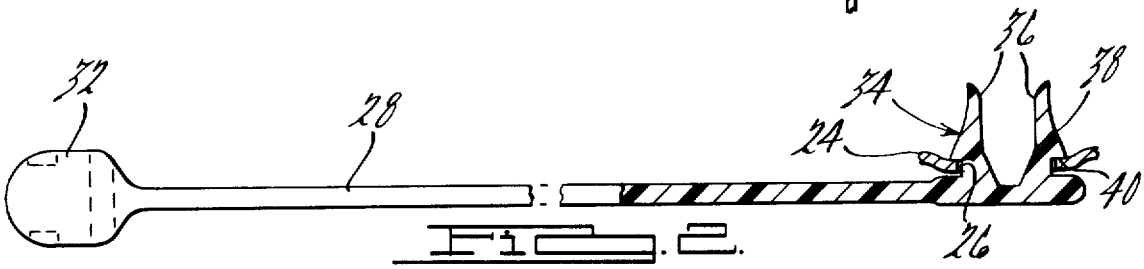
FIG. 2.
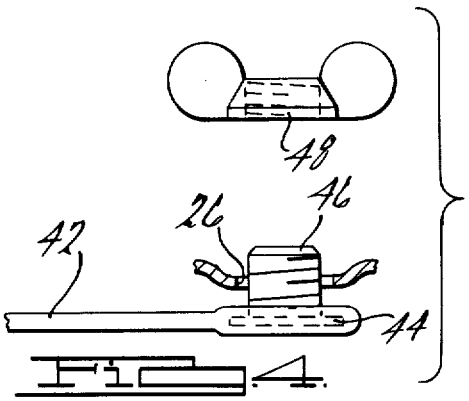
FIG. 4.
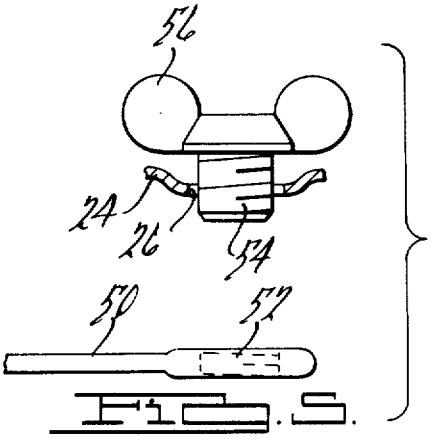
FIG. 5.

SPARE TIRE EXTRACTION DEVICE

Matter enclosed in heavy brackets [ ] appears in the original patent but forms no part of this reissue specification; matter printed in italics indicates the additions made by reissue.

SUMMARY OF THE INVENTION

Removing a spare tire from the trunk of an automobile can be an awkward and often difficult task. The spare tire is generally stored on a ledge which is separated from the access side of the trunk by the entire width of the trunk floor. Thus, it is frequently necessary to climb into the trunk or lie across the trunk in order to reach the spare tire. Furthermore, the portion of the automobile body which extends upwardly from the trunk floor at the access side of the trunk forms a barrier over which the tire (and the heavy steel wheel on which it is mounted) must be raised. Attempting to lift a heavy tire and wheel, while bending over an automobile trunk, can easily injure an individual's back.

According to the present invention, one end of a strap is fastened to one of the bolt holes of the wheel for the spare tire. The opposite end of the strap has a handle which normally lies on or adjacent the trunk floor where it can be easily grasped without climbing into the trunk. The strap extends under the tire so that, after pulling the tire to the access side of the trunk, this strap can be used to lift the spare tire up over the body wall at the access side of the trunk.

The strap which forms a part of the present invention may be conveniently molded from relatively flexible plastic to incorporate an integral handle and at least one part of the fastening means providing the connection to the wheel. Such a plastic strap is easily kept clean, is strong and yet may be made flexible enough to conform to the surface on which it lies. In one form of the invention, flexible bridge members are employed to span the space between the tire supporting ledge of the trunk and the top of the body wall at the rear of the trunk. The bridge members are fastened to the trunk ledge at their inner ends and have hooks at their outer ends designed for removable connection to the top of the wall at the rear of the trunk. The need for such bridge members will depend upon such variable factors as the size of the trunk, the weight of the spare tire and its wheel and the height of the wall at the rear of the trunk.

DESCRIPTION OF THE VIEWS OF THE DRAWINGS

FIG. 1 is a perspective view of a passenger car trunk having mounted therein a spare tire and tire removal apparatus incorporating the principles of the present invention;

FIG. 2 is a broken view partly in section and partly in elevation of the strap illustrated in FIG. 1;

FIG. 3 is a broken sectional view of one of the bridge members illustrated in FIG. 1; and FIGS. 4 and 5 are exploded views of a portion of the tire removal strap showing modified forms of attaching means therefor.

DESCRIPTION OF THE PREFERRED EMBODIMENTS

FIG. 1 illustrates a passenger car 10 having a conventional trunk 12 at the rear end thereof. The trunk 12 is normally closed by a trunk lid 14 which is spaced above a floor 16 of the trunk. A raised ledge 18 is provided at the forward end of the trunk and a body wall 20 is located at the rear of the trunk and extends upwardly from the floor 16. A spare tire 22 is shown lying on the ledge 18 in a horizontal attitude. The spare tire 22 is mounted on a conventional steel wheel 24 having a plurality of bolt holes 26. Access to the trunk is obtained by standing adjacent the wall 20. Thus, the side of the trunk bounded by the wall 20 may be designated as the access side of the trunk. In the case of an automobile having a rear engine, the trunk will lie at the front of the car and the access side of the trunk will be at the front end thereof rather than at the rear end of the vehicle.

It will be seen that the ledge 18 is spaced from the access side of the trunk a distance equal to the length of the trunk floor 16. This dimension is frequently of such a magnitude that reaching into the trunk to manually grasp and remove a spare tire while standing on the ground at the access side of the trunk presents a formidable problem.

A strap is illustrated at 28 as lying under the tire 22 and projecting forwardly from the ledge 18 so as to lie along a generally vertical wall 30 extending between the ledge 18 and the floor 16. Strap 28 has a handle 32 at one end thereof and is provided with fastening means indicated at its opposite end and indicated with at 34. The fastening means illustrated in FIG. 2 comprises a pair of resilient fingers 36 having wedge-shaped outer surfaces 38 terminating in recessed shoulders 40. The fingers 36 are molded as an integral portion of the strap 28 and may be inserted into one of the bolt holes 26 of the wheel 24. This insertion will cause the fingers 36 to move toward one another until the shoulders 40 snap past the plane of the wheel 24 in which the bolt holes 26 are formed, thus locking the fingers in place in the bolt hole.

FIGS. 4 and 5 illustrate alternative ways of connecting a strap to a spare tire. A strap 42 is illustrated in FIG. 4 as having the head 44 of a screw 46 molded into one end thereof. The screw 46 is designed to be fitted in a bolt 26 for engagement with a wing nut 48. A strap 50 shown in FIG. 5 has a threaded hole 52 molded therein for threaded engagement by a screw 54 having a winged head 56. The screw 54 is projected through a bolt hole 26 and threaded into the hole 52 to fasten the strap 50 to the wheel 24.

FIG. 1 illustrates an optional feature of the invention including a pair of flexible bridge members 58. The bridge members 58 are permanently fastened to the ledge 18 by brackets 60 which capture beads 61 formed on the inner ends of the members 58. Hook members 62 are molded into the members 58 at the outer ends thereof and are adapted to be fitted over the upper end of the body wall 20 adjacent a trunk ceiling gasket 64. The bridge members are spaced apart transversely of the car and during use extend parallel to one another, spanning the gap between the ledge 18 and the top of the wall 20. Thus, when the handle 32 is grasped the tire 22 may be pulled along the bridge members 58 in a direct path from the ledge 18 out of the trunk without first having to drop the tire down onto the floor 16 and then raising it up again over the wall 20.

Even when the bridge members 58 are not utilized, it will be appreciated that the strap 28 also provides a useful means for moving the spare tire and wheel 22,24 over the rear wall 20. Due to the fact that the strap 28 is located on the lower side of the tire 22, an upward pull on the strap 28 will incline the rear end of the tire upwardly so that it may be brought to an inclined position with its upper end resting on the top of the wall 20. By then using both hands (one on the handle 32 and the other on the wheel 22), the final movement of the tire out of the trunk 16 is readily accomplished.

In each of the embodiments of the invention illustrated herein, it will be apparent that the strap can be easily removed from the spare tire after removal of the spare tire from the trunk and before the installation of the spare tire on one of the hubs of the car. Such removal of the strap is easily accomplished without any special tools. In the form of the invention illustrated in FIG. 2, the fingers 36 are, of course, simply squeezed between the thumb and forefinger so that the shoulders 40 will clear the bolt hole 26 in which the fingers are inserted.

What is claimed is:

1. In combination, an [automobile body] *automotive vehicle* having a longitudinal axis and an interior storage area, a [raised] *generally upstanding* wall along an access side of said storage area, said wall extending generally perpendicular to said axis and transversely of said [automobile body] *vehicle,* a spare tire assembly including a tire and wheel, means in said storage area supporting said assembly in a substantially horizontal attitude and substantially parallel to said axis, said wheel having a plurality of [bolt] holes *formed* therein, said [bolt] holes being defined by a plurality of axes arranged generally parallel to said wall, and a flexible strap having a length equal to at least the radial distance between said [bolt] holes and the outer periphery of said assembly and having a handle at one end thereof and a fastening element at its opposite end, said fastening element extending generally parallel to said wall *and extending axially through* and [engaged with one of said bolt holes] *cooperative with one of the holes for securing said opposite end of said strap to said assembly,* said strap having a main body portion arranged substantially parallel to said [automobile body] *vehicle* axis and extending radially of said assembly along the underside thereof from said one [bolt] hole to a position where said handle may be conveniently grasped by a person reaching [over said wall] into said storage area, whereupon said strap may be pulled *in a direction causing said fastening element to move* toward said wall by the said person [to] *and thereby* cause said assembly to be biased [rearwardly and upwardly of said storage area, whereby the rearwardly facing portion of said assembly is moved upwardly and rearwardly so that said assembly passes up and over said wall] *longitudinally of the vehicle and out of said storage area.*

*2. The combination as set forth in claim 1 wherein said spare tire assembly includes a central hole formed in said wheel and a plurality of circumferentially spaced bolt holes formed in said wheel at a position radially outwardly from said central hole, and wherein said fastening element is cooperative with one of said bolt holes for securing said oppsite end of said strap to said assembly.*

*3. The combination as set forth in claim 1 wherein said strap extends rearwardly of said assembly whereupon said assembly will move rearwardly of said storage area when said person exerts a rearwardly applied force to said strap.*

* * * * *